Jan. 26, 1971 H. SEIDEL 3,559,108
COUPLER SWITCHES
Filed Aug. 21, 1969 3 Sheets-Sheet 1

SWITCH "OPEN"

SWITCH "CLOSED"

INVENTOR
H. SEIDEL
BY
Sylvan Sherman
ATTORNEY

COUPLER SWITCHES

Filed Aug. 21, 1969 3 Sheets-Sheet 2

COUPLER SWITCHES

Filed Aug. 21, 1969

United States Patent Office 3,559,108

Patented Jan. 26, 1971

3,559,108

COUPLER SWITCHES

Harold Seidel, Warren, N.J., assignor to Bell Telephone Laboratories, Incorporated, Murray Hill and Berkeley Heights, N.J., a corporation of New York Filed Aug. 21, 1969, Ser. No. 851,968

Int. Cl. H01p *5/12;* H03h *7/10*

U.S. Cl. 333—7 7 Claims

ABSTRACT OF THE DISCLOSURE

The parasitic elements associated with switching diodes in their high and low conductivity states are dualized. In association with a quadrature hybrid coupler, one high conductivity diode and one low conductivity diode form a balanced bridge network which inhibits signal transmission. Upon switching one of the diodes so that both are in the same conductivity state, the coupler-diode network forms the equivalent of either a series-connected, series-resonant circuit, or a parallel-connected, parallel-resonant circuit, depending upon the conductivity state of the diodes. By cascading couplers, a switch having an arbitrarily high attenuation in the "open" state, and a specified band-pass characteristic in the "closed" state is produced. A similar arrangement using magic-T hybrids is also disclosed.

This invention relates to high frequency switches.

BACKGROUND OF THE INVENTION

Because of their small size and high switching rate; diodes have been advantageously used as switches. While they generally operate satisfactorily, the parasitic reactances and resistance associated with switching diodes tend to limit the attenuation that can be realized at the higher frequencies when the switch is in its "open" state. Similarly, in its "closed" state, the diode tends to be frequency sensitive. As a result, a diode switch provides neither adequate loss when open, nor suitable transmission characteristic when closed as the frequency of operation is raised.

SUMMARY OF THE INVENTION

In accordance with the present invention, the parasitic elements associated with switching diodes in their high and low conductivity states are dualized. In association with a quadrature hybrid coupler, one high conductivity diode and one low conductivity diode form a balanced bridge network which inhibits signal transmission. Upon switching one of the diodes so that both are in the same conductivity state, the coupler-diode network forms the equivalent of either a series-connected, series-resonant circuit, or a parallel-connected, parallel-resonant circuit, depending upon the conductivity state of the diodes. By cascading couplers, a switch having an arbitrarily high impedance in the "open" state, or decoupled mode, and a specified band-pass characteristic in the "closed" state, or coupled mode, is produced.

Alternate embodiments of the invention are disclosed wherein one or both of the diodes are replaced with other types of impedance components, and wherein magic-T type hybrid couplers are used.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
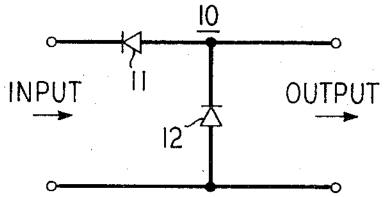
FIG. 1 (PRIOR ART)
FIG. 1 shows a typical prior art diode switch.

Referring to the drawings, FIG. 1 shows a prior art diode switch 10 comprising a series-connected diode 11 and a shunt-connected diode 12. To simplify the drawing, the diode bias circuits have been omitted. However, as is known the switch is "opened" and "closed" by changing the bias applied to the diodes. For example, the switch is open when diode 11 is biased in its low conductivity state and diode 12 is biased in its high conductivity state. Conversely, the switch is closed where diode 11 is biased in its high conductivity state and diode 12 is biased in its low conductivity state.

Figure 2:
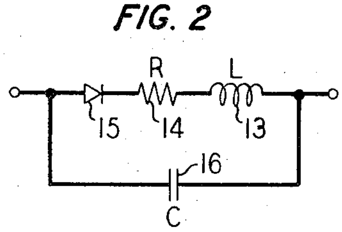
FIG. 2 shows the equivalent circuit of a typical switching diode.
Figure 3A:
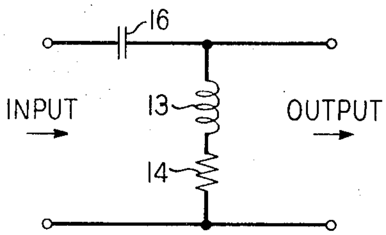
FIGS. 3A and 3B show the equivalent circuit of a typical switching diode in the "open" and "closed" states, respectively.
Figure 3B:
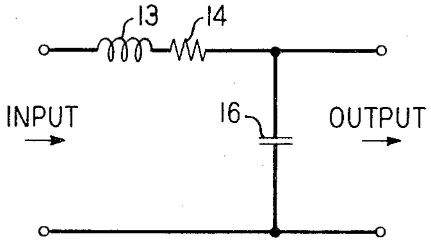

Ideally, each of the diodes would be a short circuit in its high conductivity state and an open circuit in its low conductivity state. At relatively low frequencies, i.e., below 10 megahertz, presently available PIN diodes approach these ideal approximations. At the higher frequencies, i.e., above 1 gigahertz, however, parasitic reactances and resistances can no longer be neglected and the diode is more accurately represented by the equivalent circuit shown in FIG. 2, which comprises the series combination of an inductor 13, a resistor 14 and an ideal diode 15, all in shunt with a capacitor 16. Thus, in its low conductivity state, ideal diode 15 is an open-circuit, and the diode's equivalent circuit is given by capacitor 16. In its high conductivity state, ideal diode 15 is a short-circuit, and the diode's equivalent circuit is given by the series-shunt combination of inductor 13, resistor 14 and capacitor 16. In a good, high frequency diode, the impedance of capacitor 16 will be much larger than the impedance of the inductor and resistor and, hence, can be neglected. Accordingly, the equivalent circuit of the diode switch shown in FIG. 1 is given, in its open state, by the circuit shown in FIG. 3A and, in its closed state, by the circuit shown in FIG. 3B. Typically, in its open state a good prior art switch will produce 20 to 30 db of attenuation. Higher attenuation can only be realized by cascading sections. While this improves the open switch performance, the transmission when closed is degraded since, as shown by FIG. 3B, the switch becomes a low-pass filter.

The present invention is based upon the recognition that a hybrid coupler is equivalent to a bridge circuit which, when properly "balanced," produces a null in its transmission characteristic. Accordingly, the properties of a switch utilizing diodes in conjunction with a hybrid coupler are no longer a function of the degree to which the actual diode approaches an ideal diode. In the discussion that follows, coupler switches employing quadrature couplers and 180 degree couplers are considered.

Figure 4:
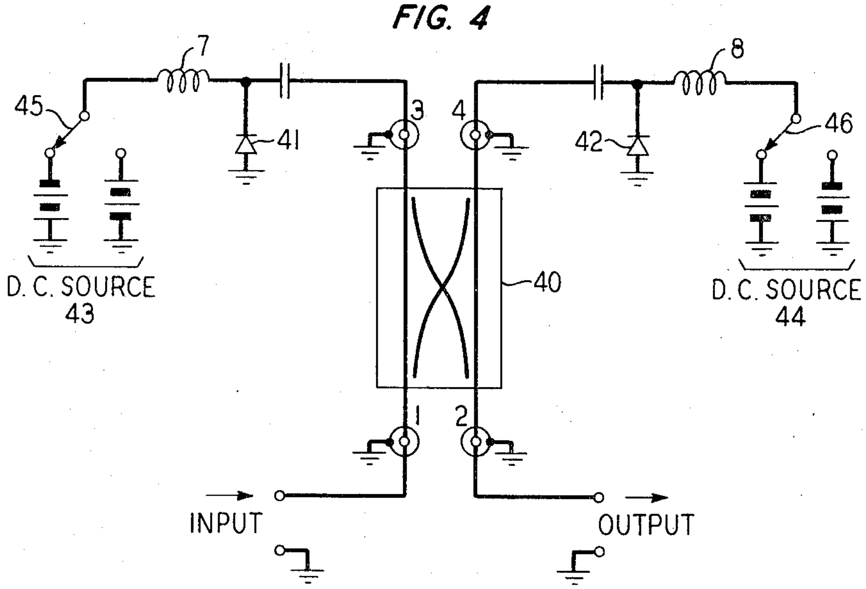
FIG. 4 shows a first embodiment of a hybrid-coupled diode switch in accordance with the present invention.

FIG. 4 shows a first embodiment of the invention comprising a quadrature coupler 40 having two pairs of conjugate ports 1, 2 and 3, 4, and two diodes 41 and 42 coupled, respectively, to the two conjugate ports 3 and 4. The other pair of conjugate ports, 1 and 2, are the input and output ports, respectively. Each of the diodes 41 and 42 is connected to an adjustable bias supply typically comprising a choke 7, 8, a direct current source 43, 44 and a selector switch 45, 46, which permits operating each diode in either its high or low conductivity state.

In this embodiment, and in all the other embodiments to be described hereinbelow, it is understood that the signal paths coupled to ports 3 and 4 are of equal lengths so as not to introduce spurious phase differences in these two paths.

Figure 5A:
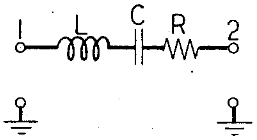
FIGS. 5A and 5B show the equivalent circuits of the switch shown in FIG. 4 when the diodes are "on," i.e., in a high conductive state, and when the diodes are "off," i.e., in a low conductive state, respectively.

In my copending application Ser. No. 671,649, filed Sept. 29, 1967, now Pat. No. 3,500,259, it is shown that the equivalent circuit of a single lumped-element quadrature coupler with one pair of conjugate ports short circuited, is a series L-C circuit. To the extent that diodes 41 and 42 are not "perfect" short circuits, the equivalent circuit will also include a small resistive element. Thus, for the case of both diodes "on," the equivalent circuit of FIG. 4 comprises, as shown in FIG. 5A, a series L-C-R circuit.

Figure 5B:
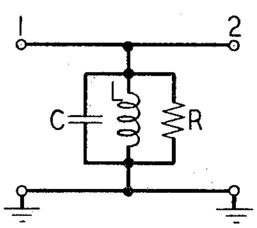

It was similarly shown in my above-identified application that an open-circuited coupler is equivalent to a shunt-connected L-C circuit. Thus, the equivalent circuit of FIG. 4 with both diodes "off" comprises, as shown in FIG. 5B, a parallel L-C-R circuit, where the shunt resistor R represents the loss due to the fact that the diodes are not perfect open circuits in their "off" state.

To determine the equivalent circuit when one diode is "on" and the other is "off," we designate the coefficient of reflection of diode 41 as $\Gamma_1$ and of diode 42 as $\Gamma_2$, and compute the reflected and transmitted signals. Each of these signals comprises two components. For example, a signal E, applied to port 1 will be divided by the coupler into two components $E\tilde{t}$ and $E\tilde{k}$, where component $Et$ is coupled to port 3 and component $E\tilde{k}$ is coupled to port 4. The $E\tilde{t}$ component is partially reflected by diode 41 and appears as a reflected component $E\tilde{t}\Gamma_1$ at port 3 where it is again divided by the coupler to product a reflected component $E\Gamma_1\tilde{t}^2$ at port 1 and a transmitted component $E\Gamma_1\tilde{t}\tilde{k}$ at port 2. Similarly, component $E\tilde{k}$ is reflected by diode 42 and appears as a reflected component $E\tilde{k}\Gamma_2$ at port 4. Upon again traversing the coupler, this signal component produces a reflected component $E\Gamma_2\tilde{k}^2$ at port 1 and a transmitted component $E\Gamma_2\tilde{k}\tilde{t}$ at port 2. Combining terms, the total reflected component $E_R$ at port 1 is $$E_R=E(\Gamma_2\tilde{k}^2+\Gamma_1\tilde{t}^2) \qquad (1)$$

and the total transmitted component $E_t$ at port 2 is $$E_t=E(\tilde{k}\tilde{t}\Gamma_1+\tilde{k}\tilde{t}\Gamma_2) \qquad (2)$$

Noting that in a single lumped-element quadrature coupler $$\tilde{t}=\frac{1}{1+i\frac{\omega}{\omega_0}} \qquad (3)$$

and $$\tilde{k}=\frac{i\frac{\omega}{\omega_0}}{1+i\frac{\omega}{\omega_0}} \qquad (4)$$

where $\omega$ is the angular frequency; and $\omega_0$ is the unity power division ratio frequency, we obtain from Equations 1 and 2 that $$E_R=E\left[\Gamma_2\cdot\frac{-\left(\frac{\omega}{\omega_0}\right)^2}{\left(1+i\frac{\omega}{\omega_0}\right)^2}+\Gamma_1\cdot\frac{1}{\left(1+i\frac{\omega}{\omega_0}\right)^2}\right] \qquad (5)$$

and $$E_t=E\left[\frac{i\frac{\omega}{\omega_0}}{\left(1+i\frac{\omega}{\omega_0}\right)^2}(\Gamma_2+\Gamma_1)\right]$$

It will be recalled that the coefficient of reflection of a short circuit is −1, whereas the coefficient of reflection of an open circuit is +1. Since, as indicated hereinabove, an actual diode in its "on" state is not quite a short circuit, the reflection coefficient for that diode will be negative, but somewhat less than unity. Similarly, the "off" diode is not quite an open circuit and, hence, its coefficient of reflection will be positive but, also somewhat less than unity.

It will also be recalled that, in accordance with the present invention, the addition of series and/or shunt elements modifies the equivalent circuit of the "off" diode so that it is the network dual of the equivalent circuit of the "on" diode. Under these conditions $\Gamma_1$, $\Gamma_2$ are equal in amplitude but opposite in sign. Thus, for example, if diode 41 is "on" and diode 42 is "off," $\Gamma_1=-\Gamma$, $\Gamma_2=\Gamma$, and Equations 5 and 6 become $$E_R=E\left[\frac{-1-\left(\frac{\omega}{\omega_0}\right)^2}{\left(1+i\frac{\omega}{\omega_0}\right)^2}\right] \qquad (7)$$

and $$E_t=0 \qquad (8)$$

It will be noted from Equation 8 that transmission is zero for all frequencies.

Similarly, when diode 41 is "off" and idode 42 is "on," $\Gamma_1=\Gamma$, $\Gamma_2=-\Gamma$, and Equations 5 and 6 reduce to $$E_R=E\Gamma\left[\frac{1+\left(\frac{\omega}{\omega_0}\right)^2}{\left(1+i\frac{\omega}{\omega_0}\right)^2}\right] \qquad (9)$$

and $$E_t-0 \qquad (10)$$

As in the previous example, the transmission expression, given by Equation 10, is frequency independent.

Figure 5C:
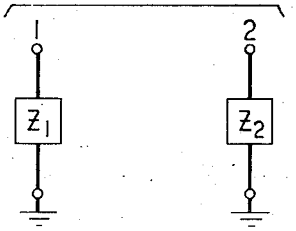
FIG. 5C shows the equivalent circuit of the switch shown in FIG. 4 when one diode is "on" and the other diode is "off"

Thus, in both instances where the diode impedances are dualized substantially all the incident power is reflected and none is transmitted. Thus, the equivalent circuit with respect to ports 1 and 2 is given, as shown in FIG. 5C, by a decoupled circuit. The input impedance $Z_1$ at port 1 and the output impedance $Z_2$ at port 2, however, do depend upon which diode is "on" and which is "off." For example, if diode 41 is "on" and iode 42 is "off," the equivalent input empedance $Z_1$ at $\omega=\omega_0$ is equal to $$Z_1=\frac{1+\frac{E_R}{E}}{1-\frac{E_R}{E}}=\frac{1+i\Gamma}{1-i\Gamma} \qquad (11)$$

Assuming $\Gamma$ is close to unity, Equation 11 reduces to $$Z\approx i \qquad (12)$$

If, on the other hand, diode 41 is "off" and diode 42 is "on," and the input impedance $Z_2$ is given by $$Z_2=\frac{1-i\Gamma}{1+i\Gamma} \qquad (13)$$

which, for $\Gamma \approx 1$ reduces to $$Z_2 \approx -i \qquad (14)$$

Thus, from Equations 12 and 14 it is noted that with the diodes in opposite states of conductivity, the impedances at ports 1 and 2 are equal in amplitude, substantially reactive, and approximately 180° out of phase. This is of significance when switches are cascaded, as will be explained in greater detail hereinbelow.

Figure 6:
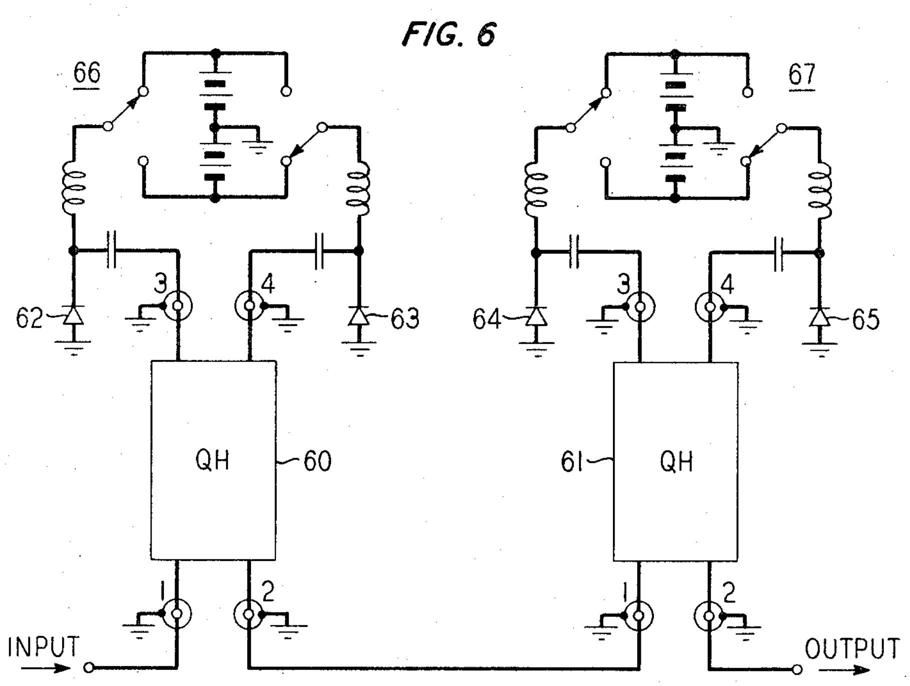
FIG. 6 shows a two stage switch in accordance with the present invention.

Having defined the equivalent circuits of the coupler-diode unit of FIG. 1 for all possible combinations of diode states, the properties of a switch constructed by cascading two or more such units is now considered in connection with FIG. 6, which shows a two unit switch. The two units are identical, comprising quadrature couplers 60 and 61 and diode pairs 62, 63, and 64, 65 coupled to conjugate ports 3 and 4 of the respective couplers. Biasing circuits 66 and 67 permit each diode to be switched to either its "on" or "off" state.

Figure 7A:
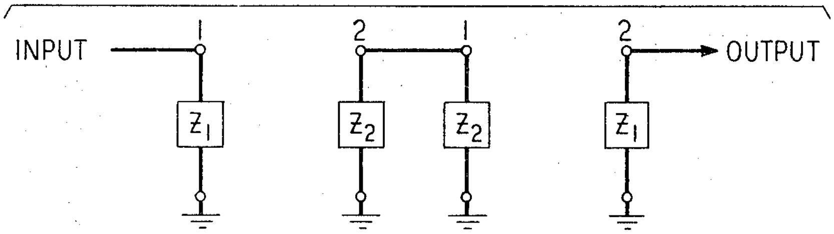
FIGS. 7A and 7B show the equivalent circuits of the switch of FIG. 6 in the "open" state and in the "closed" state, respectively.

To "open" the switch, the diodes are asymmetrically biased. That is, one diode associated with each coupler is biased "on" while the other diode is biased "off." The equivalent circuit of the switch in this state is derived by cascadng the circuit of FIG. 5C as shown in FIG. 7A.

Ideally, each unit in the "open" state is an open circuit and the attenuation across the switch is infinite. In practice, however, the attenuation across each unit is finite due to spurious, secondary effects.

In order to maximize the attenuation across the switch, the couplers are cascaded in a manner to accumulate the attenuation across the individual couplers. It will be recalled that the impedances $Z_1$ and $Z_2$ are essentially equal in amplitude, reactive, and 180° out of phase. Thus, if the output impedance at port 2 of coupler 60 is $Z_2=-i$ and the input impedance at port 1 of coupler 61 is $Z_1=i$, a resonant condition would be established causing spurious couplings and large interaction effects. This is advantageously avoided by cascading the coupler switches such that input and output impedances are shown in FIG. 7A, where the output impedance $Z_2$ of the first switch is equal to the input impedance $Z_2$ of the second switch. This, of course, is achieved by reversing the relative diode states in adjacent coupler switches; that is, while diodes 62 and 65 are in one state, diodes 63 and 64 are in the other state.

Figure 7B:
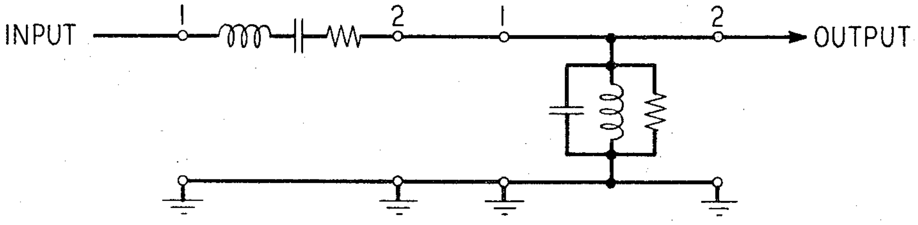

To close the switch, diodes 62 and 63 are both biased in their "on" state, while diodes 64 and 65 are both biased in their "off" state. The equivalent circuit of the closed switch is then, as shown in FIG. 7B, the combination of the equivalent circuits of FIGS. 5A and 5B. These, it will be noted, firm a band-pass filter. By designing the couplers in the manner explained in my above-identified copending application, the pass band can be made to include the frequency band of interest.

In the discussion hereinabove, it was assumed that the diodes in their "off" state are the network dual of the diodes in their "on" state. To the extent that this is not actually so, it will be necessary to add either series and/or shunt elements, as the case may be, to dualize the two diode states. For example, the duel of a series R–L circuit, is a shunt R'–C circuit. In particular, the magnitudes of the circuit parameters to satisfy the duality condition are given by $$RR'=R_0^2 \qquad (17)$$

and $$\frac{L}{C}=R_0^2 \qquad (18)$$

where $R_0$ is any arbitrary constant. As noted above, the diode in its "on" and "off" states has the general duality configuration. The parameter magnitudes, however, may not be proper to satisfy Equations 17 and 18. To illustrate, let us assume that for the diode equivalent circuit of FIG. 2

$$L=0.5\times10^{-9}\text{ h.}$$

$$C=3\times10^{-12}\text{ f.}$$

and $$R=0.2\text{ ohm}$$

Let us further assume that the diode is in a 50 ohm circuit and, hence, $R_0=50$. Substituting in Equation 18 it is evident that these values do not satisfy the equation and, hence, the diodes must be padded. Since the diode capacitance cannot be reduced, a series inductance must be added. In particular, since the total inductance obtained by substituting for C and R in Equation 18 is $7.5\times10^{-9}$ h., the added inductance required is $$7.00\times10^{-9}\text{ h.}$$

Figure 8:
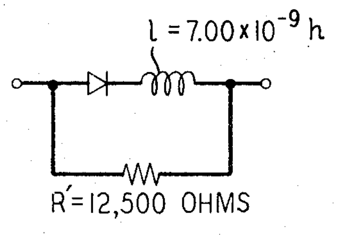
FIG. 8 shows a diode, padded by means of a series inductor and shunt resistor.

From Equation 17 we find that a shunt resistor of 12,500 ohms is also required. Thus, to dualize a diode having the above-assumed parameters with respect to 50 ohms, a series $l$ and a shunt R must be added, as shown in FIG. 8.

Figure 9:
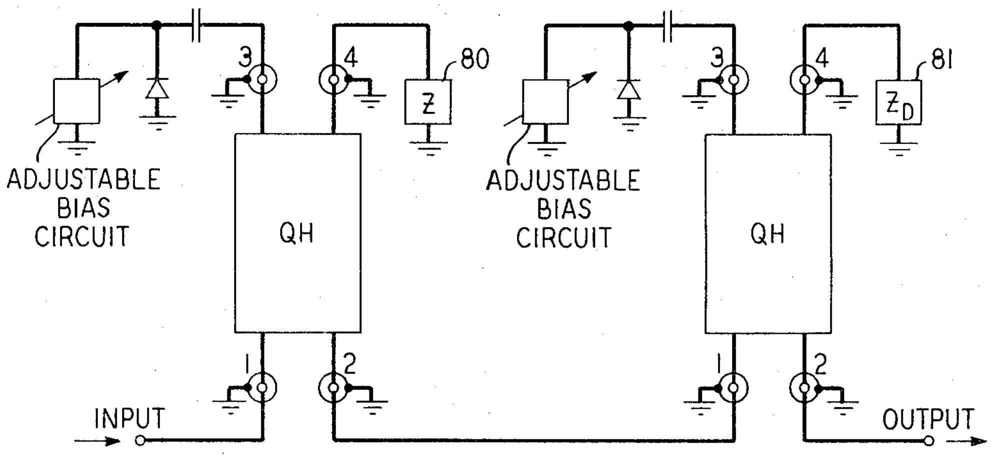
FIGS. 9 and 10 show alternate embodiments of the invention wherein other circuit components are used instead of diodes.

As indicated earlier, diodes are advantageously employed as switches because of the small size, high switching rates and low power requirements. It will be noted, however, that in the description given hereinabove, opening and closing a hybrid coupled switch involves changing the state of only one of the diodes. In practice, therefore, the other diode can be replaced with circuit components having the appropriate impedances. FIG. 9 shows a two state switch where one diode associated with each stage is replaced by other types of circuit elements 80 and 81, where the impedance $Z_D$ of one of the elements 81 is the dual of the impedance Z of element 80.

Figure 10:
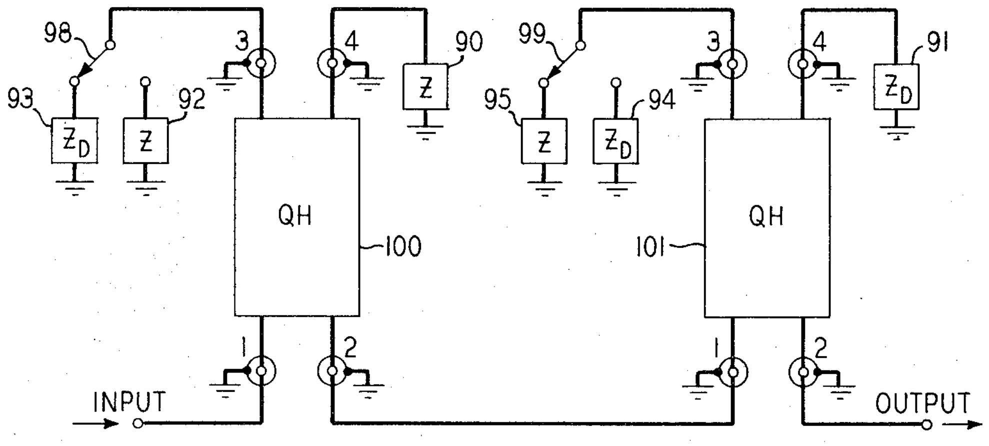

In a third embodiment of the invention, the second diode in each stage is also replaced by some other suitable circuit elements, such as a relay as illustrated in FIG. 10. In this embodiment, circuit components 90 and 91 are connected to port 4 of couplers 100 and 101, respectively. Port 3 of hybrid 100 is connected by means of a switching mechanism to either one of two circuit components 92 or 93 whose impedances, including switch 98, are, respectively, Z and $Z_D$. Similarly, port 3 of hybrid 101 is connected by means of a switching mechanism 99 to either one of two circuit components 94 or 95 whose impedances, including switch 99, are, likewise, $Z_D$ and Z, respectively.

The advantage in all of the above-described coupler switch configurations is that parasitics associated with any switching device, such as a diode, can be included in either Z and/or $Z_D$, whichever, is appropriate, to improve overall switching performance. Thus, a switching element which by itself cannot produce adequate isolation when used conventionally, can be used in a coupler switch configuration to produce arbitrarily high levels of isolation.

Figure 11:
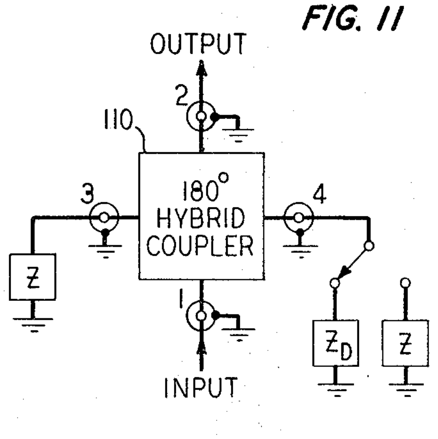
FIG. 11 shows a coupler switch using a 180 degree type coupler.

FIG. 11 shows a coupler switch employing a 180 degree coupler 110 in place of a quadrature coupler. Couplers of this type include the magic-T type couplers and the hybrid transformers. As before, ports 1 and 2 constitute the input and output ports, respectively, while the switching elements are coupled to ports 3 and 4.

Basically, a coupler switch using 180 degree hybrid couplers has the same advantages as the quadrature coupler switch. There are, however, two important differences. The first difference resides in the fact that whereas the quadrature coupler switch is open, or decoupled, in its asymmetric state, i.e., the switching element impedances are dualized, the 180 degree coupler switch is closed in its asymmetric state. Similarly, whereas the quadrature coupler switch is closed in its symmetric state, i.e., both switching elements have the same impedance, the 180 degree coupler switch is open in its symmetric state.

The second difference resides in the fact that the 180 degree coupler switch has an all-pass characteristic in its closed state, whereas the quadrature coupler switch has a bandpass characteristic in its closed state.

While FIGS. 6, 8 and 9 show two stage switches, it is understood that additional stages can be cascaded where greater attenuation is required or other circuit considerations must be satisfied. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. A switch comprising:
a 3 db hybrid coupler having two pairs of conjugate ports;
one pair of said conjugate ports being the input and output ports;
variable impedances connected to the other of said pairs of ports;
characterized in that:
the impedances in said two other ports are equal for one operating state of said switch; and
in that said impedances are network duals of each other for a second operating state of said switch.

2. The switch according to claim 1 wherein one of said impedances includes a diode; and
wherein said switch includes variable biasing means for biasing said diode in either a high or a low conductivity state.

3. The switch according to claim 1 wherein the impedance connected to each of said other pair of ports includes a diode; and
wherein said switch includes biasing means for biasing said diodes in either the same or in different conductivity states.

4. The switch in accordance with claim 1 wherein said coupler is a quadrature coupler; and
wherein said impedances are network duals when said switch is "open."

5. The switch in accordance with claim 1 wherein said coupler is a 180 degree coupler; and
wherein said impedances are network duals when said switch is "closed."

6. A multiunit coupler switch comprising:
a plurality of cascaded 3 db hybrid couplers, each having two pairs of conjugate ports;
one pair of conjugate ports of each coupler being the input and output ports for said unit;
means for coupling the output port of each of said units to the input port of the next successive unit;
a network including a diode connected to each of the other coupler ports; and
variable biasing means for individually biasing each of said diodes in either a high or a low conductivity state;
characterized in that:
the impedance of said networks with said diodes biased in one of said conductivity states is the dual of the impedance of said networks for said diodes biased in the other of said conductivity states.

7. The switch according to claim 6 wherein said couplers are quadrature couplers; and
wherein the diodes in adjacent units are biased to opposite conductivity states when said switch is closed, forming a bandpass transmission characteristic through said switch.

References Cited

UNITED STATES PATENTS

| | | | |
|---|---|---|---|
| 3,069,629 | 12/1962 | Wolff | 333—7X |
| 3,321,717 | 5/1967 | Harper | 333—7 |
| 3,503,014 | 3/1970 | Hall et al. | 333—11X |

HERMAN KARL SAALBACH, Primary Examiner

M. NUSSBAUM, Assistant Examiner

U.S. Cl. X.R.

333—11, 73